(No Model.) 2 Sheets—Sheet 1.
J. W. ESTES.
COTTON PLANTER.
No. 438,995. Patented Oct. 21, 1890.
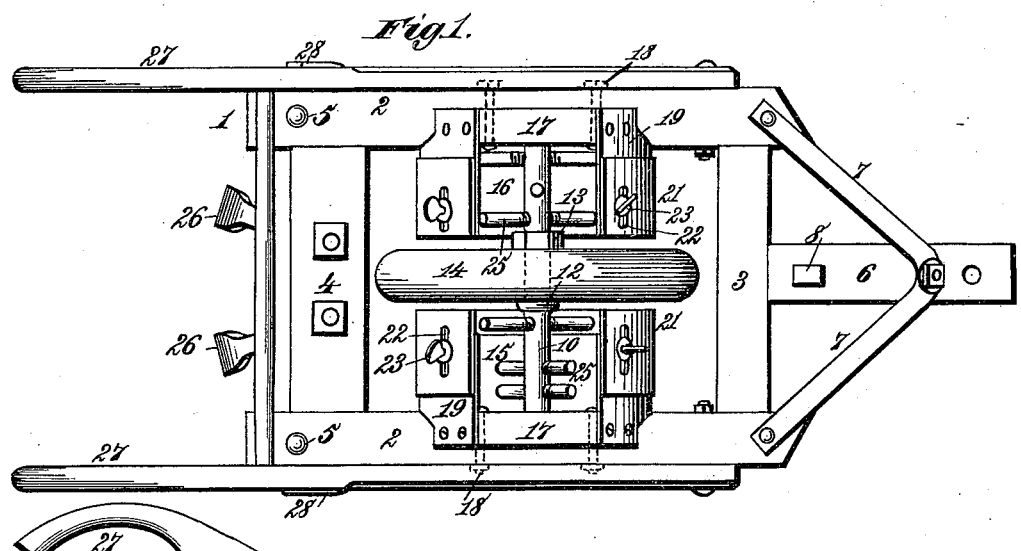
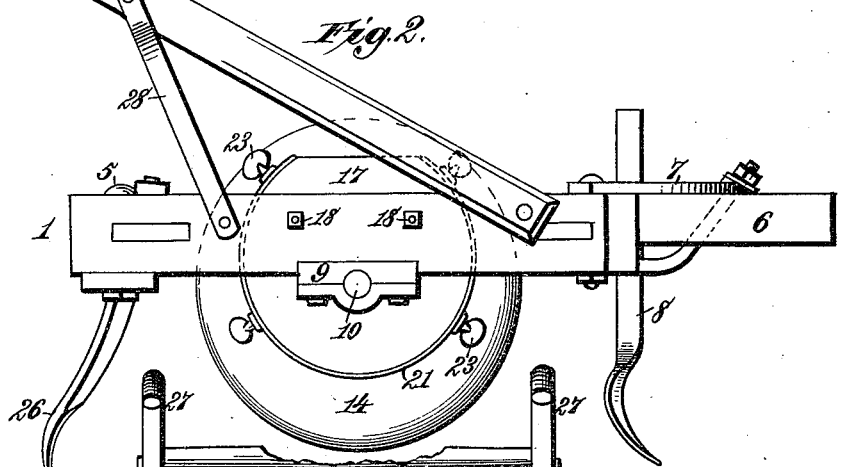
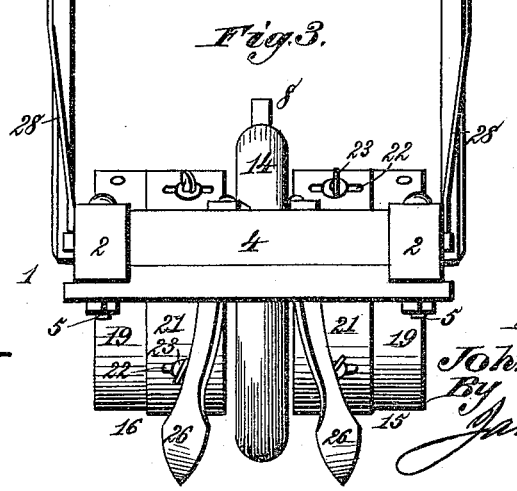
Witnesses.
Robert Everitt
Geo. W. Rea
Inventor:
John W. Estes.
By James L. Norris
Atty.

(No Model.) 2 Sheets—Sheet 2.

J. W. ESTES.
COTTON PLANTER.

No. 438,995. Patented Oct. 21, 1890.

Witnesses:
Robert Burritt,
Row Rea.

Inventor:
John W. Estes,
By James L. Norris,
Atty.

UNITED STATES PATENT OFFICE.

JOHN W. ESTES, OF LONELM, ARKANSAS.

COTTON-PLANTER.

SPECIFICATION forming part of Letters Patent No. 438,995, dated October 21, 1890.

Application filed June 23, 1890. Serial No. 356,441. (No model.)

*To all whom it may concern:*

Be it known that I, JOHN W. ESTES, a citizen of the United States, residing at Lonelm, in the county of Franklin and State of Arkansas, have invented new and useful Improvements in Cotton-Planters, of which the following is a specification.

My invention relates to certain improvements in cotton-planters; and the purpose thereof is to provide a simple and comparatively inexpensive apparatus which may be provided with a duplex or with a single hopper, whereby the seed may be dropped uniformly from one or both hoppers, or any suitable fertilizer distributed from one while the seed is fed from the other.

It is a further purpose of my invention to provide means whereby the duplex or single hoppers may have a simple and easy adjustment to regulate the feed of the seed, or of the seed and fertilizer conjointly, to any required degree, or to entirely close either hopper, if necessary.

It is my further purpose to render one of the hoppers removable from the planter and to combine with the latter a furrowing-plow arranged in advance of a wheel which runs in the forward furrow, in combination with covering plows or shovels, which raise a sharp ridge over the furrow, covering the seed and preventing it from baking, and at the same time giving what are known in the cotton-raising country as "good stands."

My invention consists to these ends in the several novel features of construction and new combinations of parts hereinafter fully set forth, and then pointed out in the claims following this specification.

To enable others skilled in the art to practice my said invention, I will describe the same in detail, reference being had to the accompanying drawings, in which—

Figure 4:
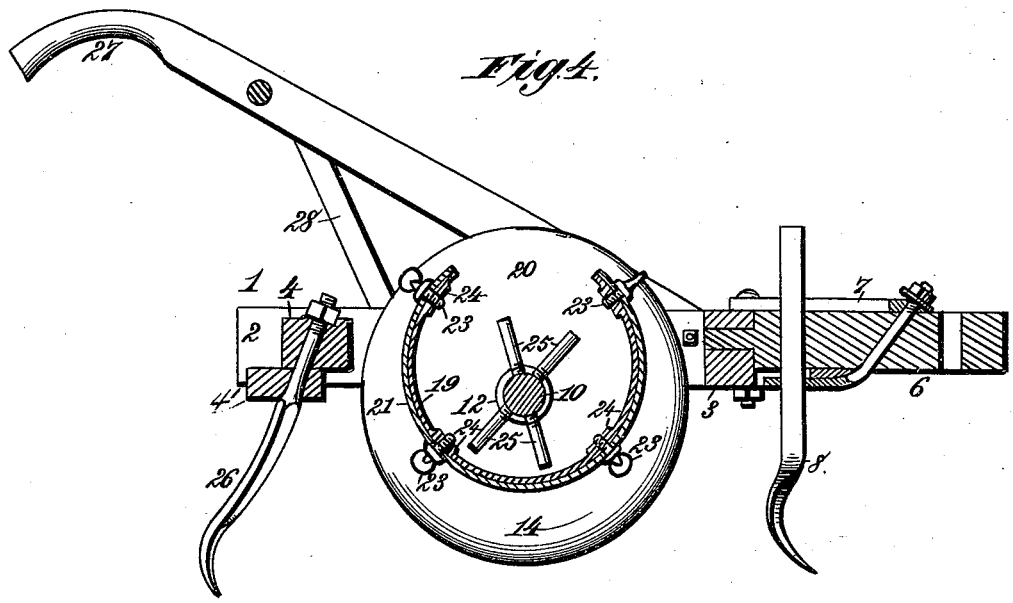
Figure 5:
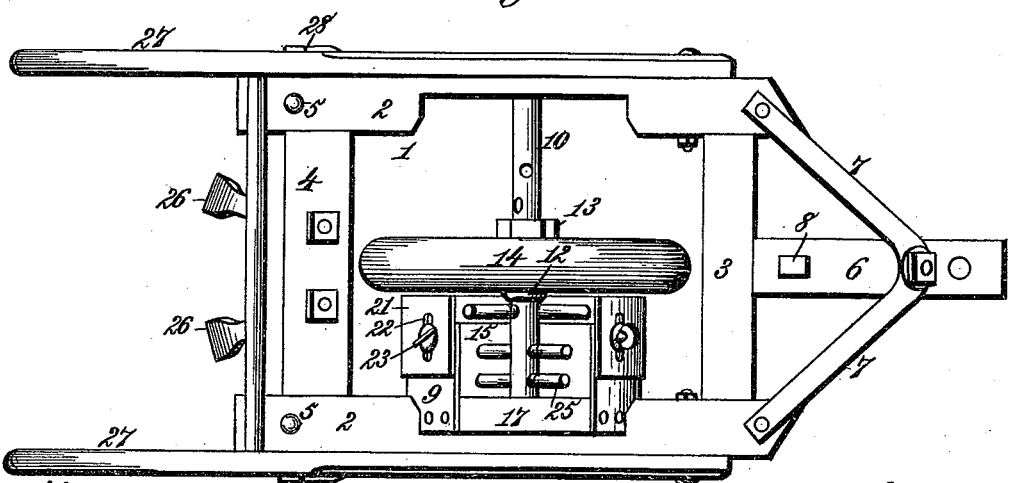

Figure 1 is a plan view showing my invention. Fig. 2 is a side elevation of the same. Fig. 3 is a rear elevation of the machine. Fig. 4 is a vertical longitudinal section taken through one of the hoppers. Fig. 5 is a plan view showing one hopper removed.

In the said drawings, the reference-numeral 1 denotes the frame of the planter, consisting of side pieces 2, having a mortised front bar 3 and a rear bar 4 mortised into the rear ends of the side pieces. This rear bar has a lower and broader piece 4', underlapping the side pieces and bolted in place by bolts 5, which also pass through the tenons of the rear bar 4'. Projecting from the central part of the front bar 3 is a beam 6, braced by diagonal iron bars 7, bolted to the ends of the side pieces. This beam receives the clevis by which the doubletree is attached, and also carries a furrowing-plow 8, of ordinary construction.

Upon the lower faces of the side bars are arranged bearings 9, in which a shaft 10 is journaled, said shaft having a shoulder 12, between which and a nut 13 is clamped a wheel 14, having a convex edge which travels in the furrow formed by the furrowing-plow to form a smooth furrow. Upon each side of this wheel are arranged hoppers 15 and 16, each being formed of a nearly-circular head 17, set within a recess in the side bar and having the shaft 10 passing through them. Upon each of these heads, which are further secured by bolts 18 passing through the side bars of the frame, is mounted a barrel or body 19, having its edge attached to the periphery of the head, and being of such width that its inner edge extends nearly to the vertical face of the central wheel. At the top of the planter these strips terminate at the ends of flattened portions of the heads to give openings 20, by which the seed and fertilizer may be easily introduced. Upon the exterior of these barrels I mount adjustable strips 21, having transverse slots 22, which receive set-screws 23, passing through the barrels and tapped into bosses 24 on the inside faces of said barrels. These set-screws are arranged at any suitable intervals, and by means of the same the adjustable strips 21 may be set inward toward the flat faces of the wheel or be drawn outward. In the former case the feed-opening, which lies between the vertical face of the wheel and the edge of each adjustable strip, may be enlarged or diminished, as circumstances may require, each hopper having an independent adjustment of its own.

Upon the shaft 10 are mounted radial beaters 25, which are preferably tapped into the shaft to render them removable. These beaters or stirrers revolve in the hoppers and keep the seed and fertilizer in constant agitation and assist in securing a uniform feed of both.

Upon the rear cross-beam of the frame are mounted covering-shovels 26, having their blades arranged at a suitable angle with the line of traction or movement and acting upon each side of the furrow formed by the front plow and wheel. These shovels draw the soil turned out upon each side by the furrowing-plow back into the furrow and form a sharp ridge above the furrow, which prevents the seed from baking and secures good stands in all cases.

The planter is guided and actuated as to the depth at which the covering-shovels act by means of handles 27, bolted to the frame and braced and supported by bars 28.

I may use any fertilizer in one of the hoppers or I may employ ashes only, and by the simple and easy adjustment of the strips moving on the barrels I may adjust the quantity of feed or discharge in both hoppers with great accuracy.

The invention provides a simple, inexpensive, and easily-operated planter, which may be used for many varieties of planting besides cotton-seed. I may also wholly remove one of the hoppers, if desired, and use the other, the removal being effected by loosening the set-screws and drawing the regulating-strips away from the wheel. Two of the beaters are then removed from the shaft at the outer end, and then the journal-boxes are removed to release the journals of the shaft, after which the bolts 18, which hold the hopper to the frame, can be removed. The hopper is then turned bottom upward and taken out.

The planter can be regulated to put out seed all around the hopper, or it may be opened at the bottom only by the variable adjustment of the strips on the barrels.

What I claim is—

1. In a planter, the combination of the rectangular frame 1, the central furrow-wheel 14, having a convex edge, the furrowing-plow 8 in front of and in line with said wheel, the covering-plows 26, arranged to follow said wheel and having their blades set at an angle with the furrow, the removable hoppers 15 and 16, located on opposite sides of the furrow-wheel and adjustable to and from said wheel, and the wheel-shaft 10, provided with removable radial stirrers 25, substantially as and for the purposes set forth.

2. In a planter, the combination of the rectangular frame 1, the plows 8 and 26, the central furrow-wheel 14, the removable hoppers 15 and 16, located on opposite sides of the furrow-wheel and composed of heads 17 and barrels 19 and adjustable strips 21, and the wheel-shaft 10, provided with removable radial stirrers 25, substantially as shown and described.

In testimony whereof I have affixed my signature in presence of two witnesses.

JOHN W. ESTES.

Witnesses:
J. T. CROCKER,
T. C. MOORE.